United States Patent
Liu

(10) Patent No.: US 11,328,542 B2
(45) Date of Patent: May 10, 2022

(54) METHOD FOR REPORTING FAULTS IN SHAREABLE VEHICLES AND PARKING DEVICE EMPLOYING THE METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Cheng-Xiang Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 375 days.

(21) Appl. No.: 16/730,255

(22) Filed: Dec. 30, 2019

(65) Prior Publication Data

US 2021/0134089 A1    May 6, 2021

(30) Foreign Application Priority Data

Nov. 1, 2019    (CN) .......................... 201911060143.0

(51) Int. Cl.
```
G07C 5/08      (2006.01)
G07C 5/00      (2006.01)
G06Q 10/00     (2012.01)
H04W 4/029     (2018.01)
H04W 4/40      (2018.01)
```

(52) U.S. Cl.
CPC ........... *G07C 5/0816* (2013.01); *G06Q 10/20* (2013.01); *G07C 5/008* (2013.01); *H04W 4/029* (2018.02); *H04W 4/40* (2018.02)

(58) Field of Classification Search
CPC ..... G07C 5/0816; G07C 5/008; H04W 4/029; H04W 4/40; G06Q 10/20
USPC ........................................................ 701/31.4
See application file for complete search history.

(56) References Cited

U.S. PATENT DOCUMENTS

2011/0202418 A1\* 8/2011 Kempton ................ B60L 53/65
                                                    705/26.1
2018/0260793 A1\* 9/2018 Li .......................... G06N 3/084

\* cited by examiner

*Primary Examiner* — Isaac G Smith
(74) *Attorney, Agent, or Firm* — ScienBiziP, P.C.

(57) ABSTRACT

A method for reporting fault information of a shareable vehicle to a server includes controlling a recognition device to connect with an identification device of the shareable vehicle, and obtain an identification code from the identification device. Information as to the location of the parking device is acquired from a GPS device, and the fault information of the shareable vehicle is received from a mobile terminal after establishing communication with the mobile terminal. The identification code and fault information of the shareable vehicle, and the location of the parking device are uploaded to the server, to give an operating company or owner of the vehicle an opportunity to repair.

14 Claims, 4 Drawing Sheets

METHOD FOR REPORTING FAULTS IN SHAREABLE VEHICLES AND PARKING DEVICE EMPLOYING THE METHOD

CROSS-REFERENCE TO RELATED APPLICATIONS

This application claims priority to Chinese Patent Application No. 201911060143.0 filed on Nov. 1, 2019, the contents of which are incorporated by reference herein.

FIELD

The subject matter herein generally relates to transportation.

BACKGROUND

Many vehicles such as bicycles and electric cars are shareable. Low quality manufacturing and irresponsible use may cause significant problems, there may be damages to QR codes, damages to car locks, damages to seats, and other mechanical damages. The damaged vehicles are often abandoned and not parked in order, this damages the urban environment and is not conducive to the recycling of shareable vehicles.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
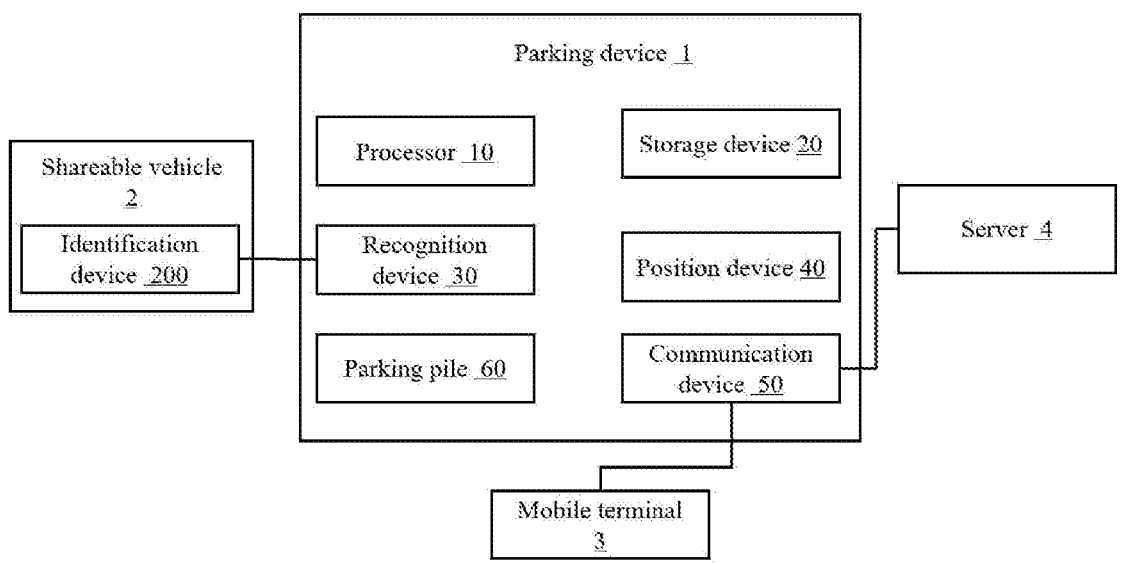
FIG. 1 illustrates an application environment architecture diagram of a parking device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any model of non-transitory computer-readable medium or other storage device. Some non-limiting examples of non-transitory computer-readable media include CDs, DVDs, BLU-RAY', flash memory, and hard disk drives. The term "comprises" means "including, but not necessarily limited to"; it specifically indicates open-ended inclusion or membership in a so-described combination, group, series, and the like.

FIG. 1 illustrates an application environment architecture diagram of a parking device. Depending on the embodiment, the parking device 1 can park different models of shareable vehicles to achieve centralized parking. When a user has parked a shareable vehicle 2 in the parking device 1, the parking device 1 can acquire an identification code from the shareable vehicle 2 and collect fault information of the shareable vehicle 2 from a mobile terminal 3, and send the identification code and the fault information to a server 4. Then, an operating company or owner of the shareable vehicle 2 has the opportunity of repairing the damaged shareable vehicle 2.

In at least one embodiment, the shareable vehicle 2 can be a shareable bicycle, or a shareable car. The mobile terminal 3 can be a smart phone, or a personal digital assistant (PDA). The server 4 can be a cloud server or a server cluster.

In at least one embodiment, the parking device 1 can include, but is not limited to, at least one processor 10, a storage device 20, a recognition device 30, a position device 40, and a communication device 50. The at least one processor 10, the storage device 20, the recognition device 30, the position device 40, and the communication device 50 communicate with each other through a system bus.

In at least one embodiment, the storage device 20 can be an internal storage device, such as a flash memory, a random access memory (RAM) for temporary storage of parameters, and/or a read-only memory (ROM) for permanent storage of parameters. The storage device 20 can also be an external storage device, such as an external hard disk, a storage card, or a data storage medium. The at least one processor 10 can be a central processing unit (CPU), a microprocessor, or other data processor chip that performs functions of the parking device 1.

In at least one embodiment, the position device 40 is a global positioning system (GPS), which can establish position the parking device 1. The communication device 50 is a wireless communication device, which can establish a communication connection with a plurality of servers 4. Each of the plurality of servers 4 corresponds to an operating company or owner.

Figure 2:
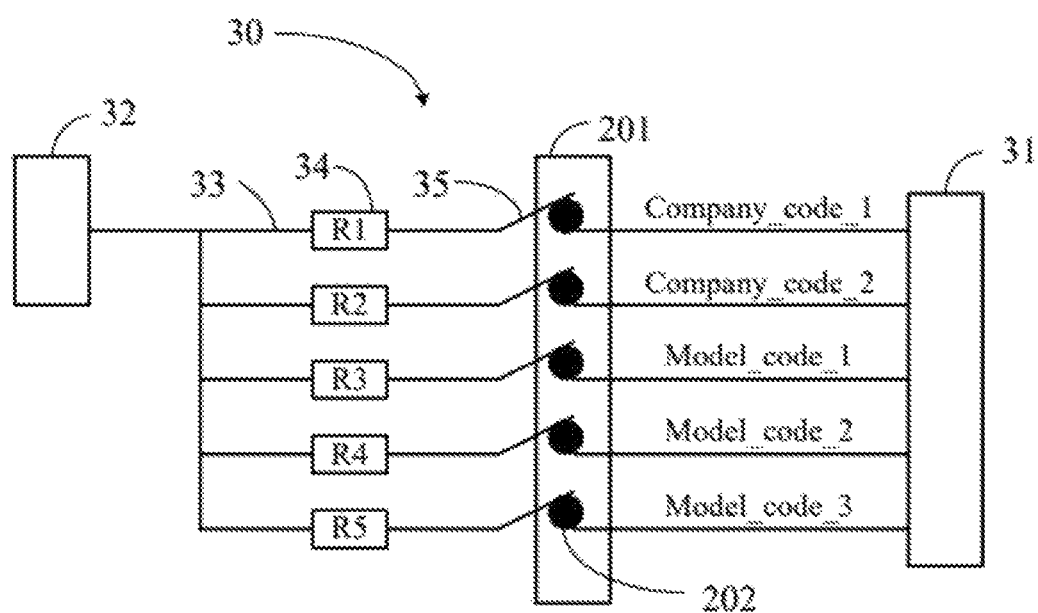
FIG. 2 is a block diagram of one embodiment of a recognition device of the parking device of FIG. 1.

FIG. 2 is a block diagram of one embodiment of the recognition device 30 of the parking device 1. In at least one embodiment, the recognition device 30 can include, but is not limited to, a recognition chip 31, a power supply 32, at least two circuit lines 33, at least two pull-up resistors 34, and at least two switches 35. A pull-up resistor 34 and a switch 35 are disposed on each circuit line 33, and the at least two circuit lines 33 are connected in parallel. The at least two circuit lines 33 can include at least one circuit line for representing a company code and at least one circuit line for representing an identification code of the shareable vehicle 2. For example, status of one of the at least two circuit lines represents the company code, and status of another represents the vehicle model code. In this embodiment, the recognition device 30 can include five circuit lines 33, five pull-up resistors 34, and five switches 35.

In at least one embodiment, the shareable vehicle 2 can include an identification device 200 and a handlebar 201. The identification device 200 is disposed on the handlebar 201. The identification device 200 can include at least two contacts 202. The at least two contacts 202 can include a metal contact 202 and/or at least one insulated contact. In this embodiment, the identification device 200 can include five contacts 202, and the five contacts 202 can include three metal contacts and two insulated contacts.

In at least one embodiment, the recognition device 30 is connected with the identification device 200, and the recognition device 30 can acquire the identification code of the shareable vehicle 2 from the identification device 200. The parking device 1 can send the fault information and position of the shareable vehicle 2 to the server 4. The server 4 is belonging to the operating company or owner of the shareable vehicle 2.

In at least one embodiment, when the shareable vehicle 2 is parked in the parking device 1, the at least two contacts 202 of the identification device 200 are both in contact with the switch 35. When the metal contacts of the at least two contacts 202 are in contact with the switch 35, the circuit line 33 where the switch 35 is disposed can conduct. When the insulated contacts of the at least two contacts 202 are in contact with the switch 35, the identification unit line 33 where the switch 35 is disposed does not conduct.

Figure 3:
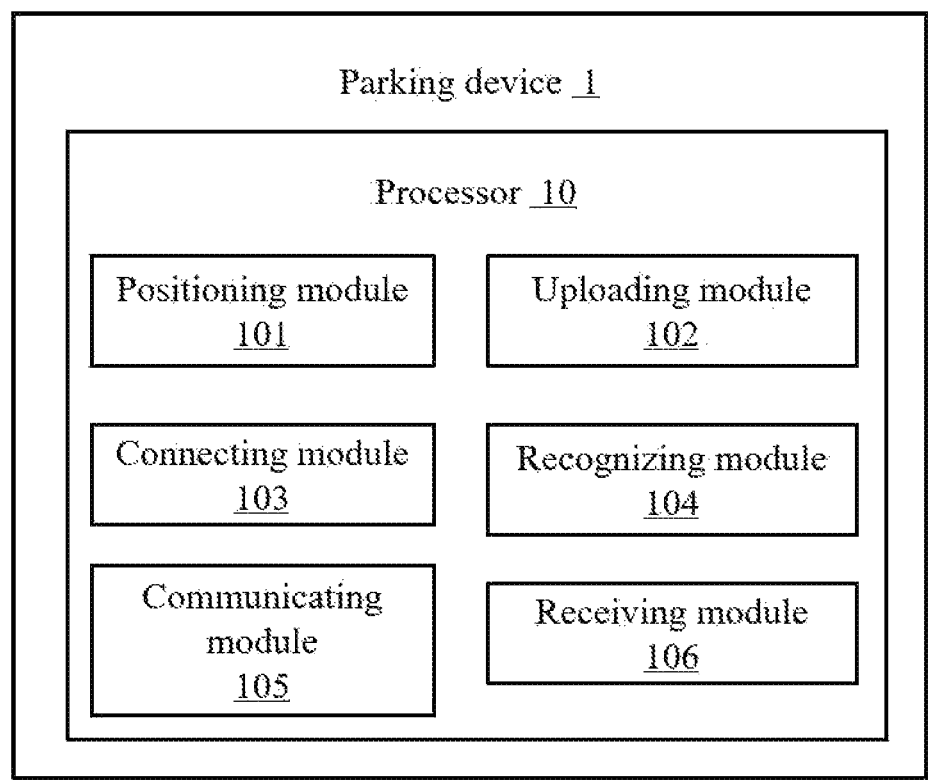
FIG. 3 is a schematic diagram of one exemplary embodiment of modules of the parking device of FIG. 1.

Referring to FIG. 3, the processor 10 can include, but is not limited to, a positioning module 101, an uploading module 102, a connecting module 103, a recognizing module 104, a communicating module 105, and a receiving module 106. The modules 101-106 can comprise computerized instructions in the form of one or more computer-readable programs that can be stored in a non-transitory computer-readable medium, for example in the storage device 20, and executed by the processor 10 of the parking device 1. It can be understood that, in other embodiments, the modules 101-106 may also be a program instruction or firmware installed in the processor 10.

In at least one embodiment, the positioning module 101 can acquire a position information of the parking device 1 by the position device 40. The position information of the parking device 1 is longitude and latitude information. In other embodiments, the position information of the parking device 1 can be a predetermined address information. For example, street, residential house number, and so on.

In at least one embodiment, the uploading module 102 can upload the position information of the parking device 1 to the server 4. The server 4 can provide a route for navigating from current location of the user to the parking device 1 based on the position information.

In at least one embodiment, the mobile terminal 3 of the user can install an application for finding the shareable vehicle 2 and the parking device 1. The application is provided by an operating company of the shareable vehicle 2. When the shareable vehicle 2 currently used by the user is broken down or malfunctioning, or the user needs to park the shareable vehicle 2, the user can, by querying the application, select a parking device 1 which is closest to the user or which is convenient to reach. The server 4 can acquire position information of the mobile terminal 3 through the application, and generate a navigation route from the position of the mobile terminal 3 to the position of the parking device 1 which is selected by the user, and send the navigation route to the mobile terminal 3 to display the navigation route. Then, the user can arrive at the parking device 1 according to the navigation route, and park the shareable vehicle 2 in the parking device 1.

In at least one embodiment, the connecting module 103 can control the recognition device 30 to be electrically connected to the identification device 200 when the shareable vehicle 2 is parked in the parking device 1.

In at least one embodiment, when the shareable vehicle 2 is parked in the parking device 1, the identification device 200 of the shareable vehicle 2 can make contact with the recognition device 30 of the parking device 1, and the connecting module 103 can control the power supply 32 of the recognition device 30 to start supplying power, so that the recognition device 30 is electrically connected to the identification device 200.

In at least one embodiment, the recognizing module 104 can recognize the identification code of the shareable vehicle 2 by the identification device 200.

In at least one embodiment, when the shareable vehicle 2 is parked in the parking device 1, the at least two contacts 202 of the identification device 200 can be in contact with the switch 35 of the recognition device 30, the recognize chip 31 can recognize the identification code of the shareable vehicle 2 according to a status of each circuit line 33.

In at least one embodiment, the identification code is a binary code, including at least one company code and at least one vehicle model code. The at least two circuit lines include at least one circuit line for representing the company code, and at least one circuit line for representing the vehicle model code. As shown in FIG. 2, the five circuit lines include two circuit lines for representing the company code, and three circuit lines for representing the vehicle model code. Then, the identification code can include two digits as the company code, and three digits as the vehicle model code.

In at least one embodiment, the power supply 32 can supply voltage to the five circuit lines 33. When a first switch of the at least two switches 35 is in contact with the metal contact, the circuit line 33 corresponding to the first switch is conducting, and the recognition chip determines that the binary code of the circuit line 33 is one. When a second switch of the at least two switches 35 is in contact with the insulated contact, the circuit line 33 corresponding to the second switch is non-conducting, and the recognition chip determines that the binary code of the circuit line is zero.

In at least one embodiment, when the metal contact 202 is in contact with the switch 35, the circuit line 33 where the switch 35 is disposed is conducting. The recognize chip 31 can receive a voltage signal, and the recognizing module 104 can determine that the status of the circuit line 33 is conducting, and that a binary code corresponding to the line 33 is one. When the insulated contact 202 is in contact with the switch 35, the circuit line 33 where the switch 35 is disposed is non-conducting. The recognition chip 31 does not receive the voltage signal, and the recognizing module 104 determines that the status of the circuit line 33 is non-conducting, and that a binary code corresponding to the circuit line 33 is zero.

For example, as shown in FIG. 2, the contacts 202 which may be in contact with the switch 35, from top to bottom, are metal contact, insulated contact, metal contact, metal contact, and insulated contact in that order. Then, the status of the five circuit lines 33 from the top to bottom are conducting, non-conducting, conducting, conducting, and non-conducting. The recognition chip 51 can generate the identification code of the shareable vehicle by combining the binary code of each circuit line. For example, the recognition chip 51 can determine that the identification code of the shareable vehicle 2 is 10110 based on the statuses of the five circuit lines. The digits 10 of the identification code are the company code, and the digits 110 of the identification code are the vehicle model code.

In at least one embodiment, the communicating module 105 can control the communication device 50 to communicate with the mobile terminal 3 of the user.

In at least one embodiment, the communication device 50 is a WI-FI module. When the mobile terminal is physically close to the communication device 50, the communication module 105 can control the communication device 50 to establish a WI-FI connection with the mobile terminal 3.

In other embodiments, the communication module 105 can control the communication device 50 to establish a WI-FI connection with the mobile terminal 3 after the mobile terminal 3 has sent a correct password. In other embodiments, the communication device 50 can be a BLUETOOTH device.

In at least one embodiment, the receiving module 106 can receive fault information of the shareable vehicle 2 sent by the mobile terminal 3.

In at least one embodiment, the fault information can include, but is limited to, images of faulty part or fault area of the shareable vehicle 2, and a text description corresponding to the fault. The images are captured by the mobile terminal 3, and the text description is edited by a user through the mobile terminal 3.

In at least one embodiment, the uploading module 102 can further upload the identification code and the fault information of the shareable vehicle 2, and the position of the parking device 1, to the server 4.

In at least one embodiment, the uploading module 102 further can recognize the operating company to which the shareable vehicle 2 belongs through the company code of the identification code, and send the identification code and the fault information to the server 4 of the operating company. Then, the operating company is able to repair the shareable vehicle 2 according to the identification code and the fault information.

In at least one embodiment, the parking device 1 can include several stands or rails or racks (parking piles 60), and each parking pile 60 can park a shareable vehicle 2. Each parking pile 60 corresponds to a number. The receiving module 106 can receive the number of the parking pile 60 sent by the mobile terminal 3 after the shareable vehicle 2 is parked. The uploading module 102 can further upload the number of the parking pile 60 to the server 4. The number of the parking pile 60 will distinguish shareable vehicles 2 parked by multiple users at the same time.

In at least one embodiment, the server 4 can determine a type of the fault of the shareable vehicle 2 based on the fault information. The types of fault can include two-dimensional code faults, lock faults, seat faults, transmission faults, wheel faults, rain flap faults, and carrying basket faults. Each fault type corresponds to a fault code, and each position information corresponds to a position code.

In at least one embodiment, the server 4 can generate a faulty system number according to the identification code, the fault code, and the position code. The format of the faulty system number is identification code+fault code+position code. For example, the faulty system number can be 1011001ABCD.

The server 4 can inform the operator company and invite repair of the damaged shareable vehicle after generating the faulty system number, and track the repair progress based on the faulty system number. After repair and a return to service of the repaired shareable vehicle 2, the server 4 may also provide users with rewards, such as free car mileage, vouchers, etc., through the application.

Figure 4:
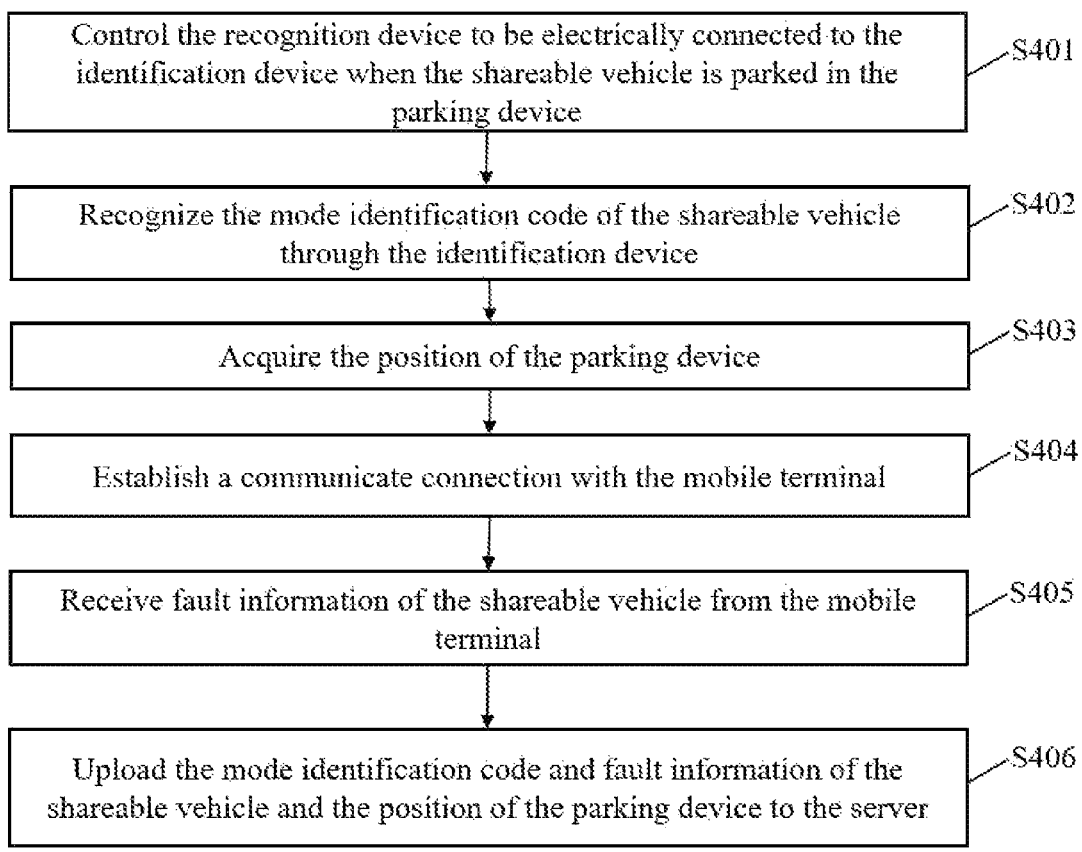
FIG. 4 illustrates a flowchart of one embodiment of a method for reporting fault in shareable vehicles, applied in the parking device of FIG. 1.

FIG. 4 illustrates a flowchart of one embodiment of a method for reporting fault of the shareable vehicles 2. In an example embodiment, the method is performed by execution of computer-readable software program codes or instructions by the processor 10 of the electronic device 1.

Referring to FIG. 4, the method is provided by way of example, as there are a variety of ways to carry out the method. The method described below can be carried out using the configurations illustrated in FIG. 1, for example, and various elements of these figures are referenced in explaining method. Each block shown in FIG. 4 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S401.

At block S401, the parking device 1 can control the recognition device 30 to be electrically connected to the identification device 200 when the shareable vehicle 2 is parked in the parking device 1.

At block S402, the parking device 1 can recognize the mode identification code of the shareable vehicle 2 through the identification device 200.

At block S403, the positioning device 40 can acquire the position of the parking device 1.

At block S404, the communication device 50 can establish a communicate connection with the mobile terminal 3.

At block S405, the parking device 1 can receive fault information of the shareable vehicle 2 from the mobile terminal.

At block S406, the parking device 1 can upload the mode identification code and fault information of the shareable vehicle 2, and the position of the parking device 1 to the server 4.

In at least one embodiment, parking device and fault reporting and repair method provide a solution for the centralized parking of the shareable vehicle 2, which not only maintains the urban environment, but also can perform fault reporting and repair according to the model of the shared vehicle 2, which effectively reduces the number of faulty vehicles and is convenient for users recycle use the shared vehicle 2.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:
1. A parking device comprising:
a storage device;
a recognition device;
a position device;

a communication device, which is communicating with a plurality of servers, and at least one processor, the storage device storing one or more programs that, when executed by the at least one processor, cause the at least one processor to:

control the recognition device to be electrically connected with an identification device of a shareable vehicle when the shareable vehicle is parked in the parking device;

obtain an identification code of the shareable vehicle from the identification device;

acquire position information of the parking device from the position device;

establish a communication with a mobile terminal by the communication device;

receive fault information of the shareable vehicle from the mobile terminal; and upload the identification code and fault information of the shareable vehicle, and the position information of the parking device to the server.

2. The parking device according to claim 1, wherein the identification device of the shareable vehicle comprises at least two contacts, and the at least two contacts comprise a metal contact and at least one insulated contact, the recognition device of the parking device comprises at least two circuit lines for correspondingly connecting with the at least two contacts, and the recognition device recognizes the identification code of the shareable vehicle through a status of each of the at least two circuit lines when the recognition device is electrically connected with the identification device.

3. The parking device according to claim 2, wherein the identification code is a binary code, and the identification code comprises at least one company code, and at least one vehicle model code, the status of one of the at least two circuit lines represents the at least one company code, and the status of a remaining of the at least two circuit lines represents the at least one vehicle model code.

4. The parking device according to claim 2, wherein the recognition device further comprises:

a recognition chip;

a power supply which provides voltage to the at least two circuit lines;

at least two pull-up resistors;

and at least two switches configured to be connected to the at least two contacts of the shareable vehicle;

when a first switch of the at least two switches is in contact with the metal contact, the circuit line corresponds to the first switch is conducting, the recognition chip determines that a binary code of the circuit line corresponding to the first switch is one;

when a second switch of the at least two switches is in contact with the at least one insulated contact, the circuit line corresponds to the second switch is non-conducting, the recognition chip determines that a binary code of the circuit line corresponding to the second switch is zero;

the recognition chip generates the identification code of the shareable vehicle by combining each binary code of each circuit line.

5. The parking device according to claim 1, further comprising a plurality of parking piles, each of the plurality of parking piles corresponds a number, wherein the at least one processor is further caused to:

when the shareable vehicle is parked at one of the plurality of parking piles, upload the number of the parking pile where the shareable vehicle is parked to the server.

6. The parking device according to claim 1, wherein the fault information comprises images of fault locations of the shareable vehicle, and a text description corresponding to faults.

7. A method for reporting fault of shareable vehicles applicable in a parking device, the parking device communicating with a plurality of servers, and the parking device comprising a recognition device, a position device, and a communication device, the method comprising:

controlling the recognition device to be electrically connected with an identification device of a shareable vehicle when the shareable vehicle is parked in the parking device;

obtaining an identification code of the shareable vehicle from the identification device;

acquiring position information of the parking device from the position device;

establishing a communication with a mobile terminal by the communication device;

receiving fault information of the shareable vehicle from the mobile terminal; and uploading the identification code and fault information of the shareable vehicle, and the position information of the parking device to the server.

8. The method according to claim 7, wherein a method of obtaining an identification code of the shareable vehicle from the identification device comprises:

recognizing the identification code of the shareable vehicle through a status of each of at least two circuit lines when the recognition device is electrically connected with the identification device, wherein the identification device of the shareable vehicle comprises at least two contacts, and the at least two contacts comprise a metal contact and at least one insulated contact, the recognition device of the parking device comprises at least two circuit lines for correspondingly connecting with the at least two contacts.

9. The method according to claim 8, wherein the identification code is a binary code, and the identification code comprises at least one company code, and at least one vehicle model code, the status of one of the at least two circuit lines represents the at least one company code, and the status of a remaining of the at least two circuit lines represents the at least one vehicle model code.

10. The method according to claim 7, wherein the fault information comprises images of fault location of the shareable vehicle, and a text description corresponding to the fault.

11. A non-transitory storage medium having stored thereon instructions that, when executed by a processor of a parking device, causes the processor to perform a method for reporting fault of shareable vehicles, the parking device communicating with a plurality of servers, and the parking device comprising a recognition device, a position device, and a communication device, the method comprising:

controlling the recognition device to be electrically connected with an identification device of a shareable vehicle when the shareable vehicle is parked in the parking device;

obtaining an identification code of the shareable vehicle from the identification device;

acquiring position information of the parking device from the position device;

establishing a communication with a mobile terminal by the communication device;

receiving fault information of the shareable vehicle from the mobile terminal; and uploading the identification code and fault information of the shareable vehicle, and the position information of the parking device to the server.

12. The non-transitory storage medium according to claim 11, wherein a method of obtaining an identification code of the shareable vehicle from the identification device comprises:

recognizing the identification code of the shareable vehicle through a status of each of at least two circuit lines when the recognition device is electrically connected with the identification device, wherein the identification device of the shareable vehicle comprises at least two contacts, and the at least two contacts comprise a metal contact and at least one insulated contact, the recognition device of the parking device comprises at least two circuit lines for correspondingly connecting with the at least two contacts.

13. The non-transitory storage medium according to claim 12, wherein the identification code is a binary code, and the identification code comprises at least one company code, and at least one vehicle model code, the status of one of the at least two circuit lines represents the at least one company code, and the status of a remaining of the at least two circuit lines represents the at least one vehicle model code.

14. The non-transitory storage medium according to claim 11, wherein the fault information comprises images of fault location of the shareable vehicle, and a text description corresponding to the fault.

* * * * *